United States Patent [19]

Sonnen

[11] Patent Number: 4,779,320
[45] Date of Patent: Oct. 25, 1988

[54] ROLL FOR USE IN CALENDERS
[75] Inventor: Rudolf Sonnen, Krefeld, Fed. Rep. of Germany
[73] Assignee: Kleinewefers GmbH, Krefeld, Fed. Rep. of Germany
[21] Appl. No.: 11,899
[22] Filed: Feb. 6, 1987
[30] Foreign Application Priority Data
Feb. 15, 1986 [DE] Fed. Rep. of Germany ....... 3604839
[51] Int. Cl.⁴ .............................................. B21B 27/00
[52] U.S. Cl. ................... 29/116.1; 29/129; 29/130
[58] Field of Search ............ 29/130, 129, 129.5, 29/116 R, 116 AD
[56] References Cited

U.S. PATENT DOCUMENTS 3,737,963  6/1973  Postulka et al. ............... 29/130
3,827,120  8/1974  Mayer ........................... 29/130
3,847,260  11/1974 Fowler .......................... 29/130
4,121,521  10/1978 Gill .............................. 29/130
4,305,191  12/1981 Enomoto ..................... 29/116 AD
4,447,940  5/1984  Appenzeller ................ 29/116 AD
4,455,727  6/1984  Tschirner .................... 29/116 AD Primary Examiner—P. W. Echols
Assistant Examiner—Irene Cuda
Attorney, Agent, or Firm—Peter K. Kontler

[57] ABSTRACT

A roll for use in calenders and like machines has a non-rotatable shaft which is surrounded by a radially movable rotary shell whose end portions carry sleeves. When the shell is to float relative to the shaft, the sleeves have freedom of limited movement with reference to the shaft in the radial direction of the shell in parallelism with a plane which includes the axis of the shell and the nip which the shell defines with the shell of a neighboring roll. Arcuate inserts are introduced between the sleeves and the adjacent portions of the external surface of the shaft to hold the shell against floating so that the movements of the shell are then confined to rotation about a fixed axis.

9 Claims, 3 Drawing Sheets

ROLL FOR USE IN CALENDERS

BACKGROUND OF THE INVENTION

The invention relates to improvements in flexure-resistant pressure rolls for use in calenders and like machines. More particularly, the invention relates to improvements in rolls of the type disclosed in commonly owned U.S. Pat. Nos. 4,520,723 (granted June 4, 1985 to Pav et al.), 4,394,793 (granted July 26, 1983 to Pav et al.), 4,328,744 (granted May 11, 1982 to Pav et al.) and 4,457,057 (granted July 3, 1984 to Pav).

It is known to assemble a flexure-resistant roll for use in roll stacks of machine calenders, supercalenders and press sections from a cylindrical shell and a stationary shaft or an analogous carrier which is spacedly surrounded by the shell. The shell has a certain freedom of radial movement relative to the carrier, and its shape is controlled by one or more rows of hydrostatic bearing elements which are interposed between the shell and the carrier and are operated in response to signals from sensors which monitor the quality of the processed web, the temperature of the peripheral surface of the shell and/or other parameters. Such regulation of the shape of the shell is necessary in order to influence the geometry of the nip between the shell and an adjacent roll. It is further known to provide the ends of the shell with sleeves which are surrounded by bearings and are movable radially of the shell, at least in a plane which includes the nip and the axis of the shell, so as to allow for a widening or narrowing of the nip in directions which are parallel to the supporting plane of the roll.

A roll wherein the bearings at the ends of the shell are movable radially of the carrier is marketed by the assignee of the present application under the designation "HYDREIN Typ R". This roll has several rows of hydrostatic bearing elements and its shell is free to float in the radial direction relative to the carrier. Such arrangement is desirable and advantageous because it eliminates the need for external roll loading. The bearings at the ends of the shell surround sleeves having a predetermined freedom of radial movement in directions which are parallel to the supporting plane of the roll. Reference may also be had to German Pat. No. 31 24 616, to German Auslegeschrift No. 28 26 316, and to German Offenlegungsschrift No. 31 38 365.

Another roll which is manufactured by the assignee of the present application and is known as "HYDREIN Typ C" is constructed and assembled in such a way that the bearings at the axial ends of the shell are mounted directly on the stationary carrier, i.e., the end portions of the shell cannot float relative to the carrier. The mode of operation of hydrostatic bearing elements which are interposed between the shell and the carrier is the same as in the "HYDREIN Typ R" roll.

The just discussed rolls can be used in a wide variety of machines. One of the presently preferred uses of such rolls is in the paper processing industries. Certain other types of supercalenders employ both types of rolls, i.e., those wherein the shell can float radially of the carrier and those wherein the end portions of the shell can rotate relative to but cannot move radially of the carrier. The presence of two types of rolls renders it necessary to maintain two sets of spare parts. Moreover, and since such rolls are often used in mass-producing plants, it is necessary to maintain at least one roll of each type in a state of readiness for immediate replacement of a defective roll. All this contributes to initial and maintenance cost of the machines as well as to space requirements for spare parts and spare rolls.

OBJECTS AND SUMMARY OF THE INVENTION

An object of the invention is to provide a novel and improved roll which can be used as a roll with a floating shell or as a roll wherein the end portions of the shell cannot move radially of the carrier.

Another oject of the invention is to provide a novel and improved method of converting a roll with a floatig shell into a roll wherein the end portions of the shell cannot move radially of the carrier or vice versa.

A further object of the invention is to provide novel and improved means for converting a roll with a floating shell into a roll whose shell has radially fixed end portions.

An additional object of the invention is to provide a machine which embodies the above outlined roll.

A further object of the invention is to provide a calender which embodies the above outlined roll.

Another object of the invention is to provide a roll whose versatility exceeds that of heretofore known rolls.

Still another object of the invention is to provide a roll which can be installed in existing supercalenders and like machines.

One feature of the present invention resides in the provision of a roll for use in calenders and like machines. The roll comprises a carrier (e.g., an elongated shaft which is non-rotatably secured in the frame of the machine), a shell which spacedly surrounds the carrier, and sleeves which are provided on the end portions of the shell. The sleeves and the carrier respectively have confronting internal and external surfaces and the sleeves are movable relative to the carrier in the radial direction of the shell to and from end positions in which the external surfaces and the respective internal surfaces define clearances each of which has a predetermined width at one side of the axis of the shell. The roll further comprises removable inserts which are or can be disposed in the respective clearances to hold the sleeves against movement from the respective end positions. Thus, when the inserts are extracted or expelled from the respective clearances, the shell and its sleeves can float relative to the carrier in the radial direction of the sleeve. However, once the inserts are introduced into the respective clearances (this takes place subsequent to movement of the sleeves to the aforementioned end positions), the ability of the shell to float is terminated, i.e., the shell is then confined to angular movements about a fixed axis.

Each clearance preferably has a maximum width in a predetermined plane including the axis of the shell and the nip which the shell defines with the shell of an adjoining roll. The inserts contact the respective internal and external surfaces as well as at both sides of such plane.

The internal and external surfaces can constitute cylindrical surfaces, and the diameter of each internal surface exceeds the diameter of the respective external surface by a predetermined value corresponding to the maximum width of the clearances. Each insert can have a concave surface which conforms to the respective external surface and a convex surface which conforms to the respective internal surface. Each of the inserts preferably extends along an arc of less than 180°, more preferably along an arc of 100°–140° and most preferably along an arc of approximately 120°.

The concave and/or convex surface of each insert can be provided with one or more grooves which extend in substantial parallelism with the axis of the shell when the inserts are introduced into the respective clearances.

The internal surface of each sleeve can include one or more noncircular portions, and each insert is then formed with an external surface including one or more portions which are complementary to the noncircular portions of the respective internal surfaces.

The carrier can be provided with a fixed stop (e.g., in the form of a circumferentially extending shoulder) for each of the inserts, and the roll can further comprise means for biasing the inserts against the respective stops in the axial direction of the shell. Each biasing means can comprise an annular sealing element which surrounds the carrier, and each insert is disposed between the respective shoulder and the respective sealing element.

Another feature of the invention resides in the provision of a method of converting a calender roll wherein a non-rotatable carrier is spacedly surrounded by a rotary shell whose end portions carry or constitute sleeves which are movable relative to the carrier in the radial direction of the shell. The method comprises the steps of effecting a relative movement of the shell and carrier radially of the shell until the carrier abuts the sleeves, and thereupon releasably fixing the sleeves against movement with reference to the carrier in the radial direction of the shell. The fixing step can comprise introducing an insert (e.g., a substantially crescent-shaped insert) between each sleeve and the carrier. The step of effecting a relative movement between the carrier and the sleeves can comprise placing a support against the periphery of the shell (e.g., from below the shell) and moving the carrier with reference to the shell (e.g., moving the carrier downwardly until its external surface comes in contact with the internal surfaces of the sleeves). The support can engage the recessed end portions of the periphery of the shell, namely those portions which were held in the headstock and tailstock of a grinding machine during grinding of the major part of the peripheral surface of the shell.

The novel features which are considered as characteristic of the invention are set forth in particular in the appended claims. The improved roll itself, however, both as to its construction and the mode of converting the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
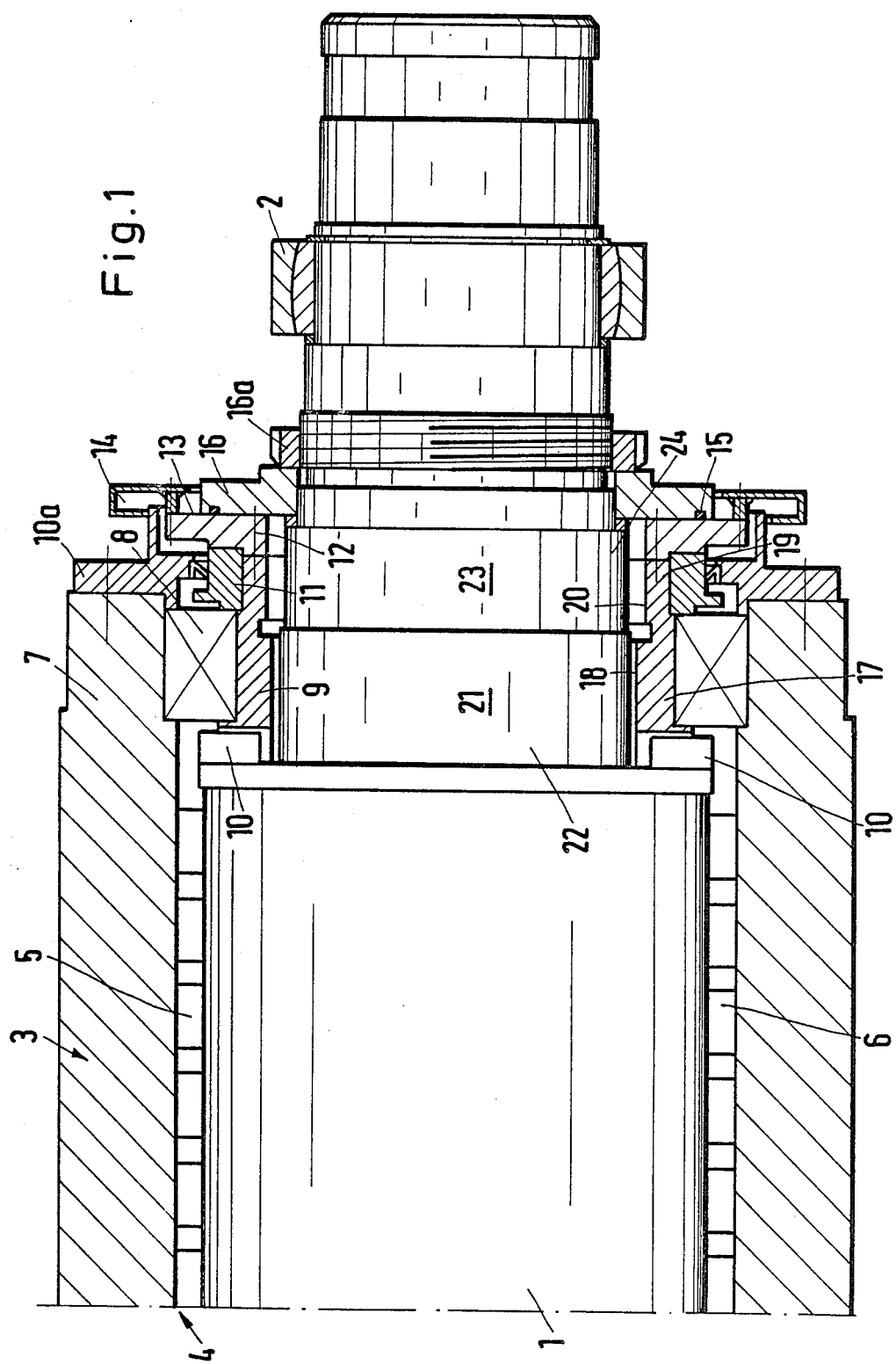
FIG. 1 is a fragmentary central longitudinal sectional view of a roll which embodies one form of the invention and wherein the shell is free to float relative to the carrier.

FIG. 1 shows a portion of a roll which comprises a stationary non-rotatable carrier 1 the end portions of which are mounted in spherical bearings 2 which, in turn, are mounted in the frame of a calender or an analogous machine. The roll further comprises a cylindrical shell 3 which surrounds the carrier 1 between the spherical bearings 2 and whose shape can be changed by a deflection correcting system 4 including at least one first row of hydrostatic bearing elements 5 and at least one second row of hydrostatic or other bearing elements 6 diametrically opposite the bearing elements 5. The end portions 7 of the sleeve 3 surround antifriction bearings 8 which, in turn, surround sleeves 9. Each sleeve 9 is non-rotatably connected with the carrier 1 by one or more coupling devices 10 which enable the sleeve to move with the shell 3 in the radial direction of the shell and relative to the carrier 1. Reference may be had to the aforementioned U.S. Pat. No. 4,520,723 to Pav et al.

Each bearing 8 can constitute a ball or roller bearing. The means for holding the illustrated bearing 8 against axial movement relative to the carrier 1 comprises a ring 11 which is preferably provided with a chromium oxide layer and abuts the inner race of the bearing 8. The ring 11 is held axially between such inner race (which cannot rotate with reference to the sleeve 9) and a second ring 12 which is fixed to the sleeve 9. The outer race of the bearing 8 is biased axially by a cap 10a and is compelled to rotate with the shell 3. The outer side 13 of the ring 12 (i.e., the side which faces away from the bearing 8 and ring 11) is in sealing engagement with an annular receptacle 14 which collects lubricant leaking from the space for the rolling elements between the inner and outer races of the bearing 8. A washer-like sealing element 16 abuts the outer side 13 radially inwardly of the receptacle 14, and its inner side has a ring-shaped groove for an O-ring 15 or another suitable sealing element which is biased against the outer side 13. The sealing element 16 is held in the illustrated axial position by a nut 16a mating with the adjacent externally threaded portion of the carrier 1. The other half of the roll is or can be a mirror image of the illustrated half.

The illustrated sleeve 9 has a first annular section 17 with a cylindrical internal surface 18, and a second annular section 19 with a non-cylindrical internal surface 20. The surface 18 surrounds a portion of the cylindrical peripheral (external) surface 22 of a first portion 21 of the carrier 1. The internal surface 20 of the annular section 19 surrounds the cylindrical peripheral (external) surface 24 of a second portion 23 of the carrier 1. The diameter of the surface 24 is somewhat smaller than that of the surface 22.

Figure 2:
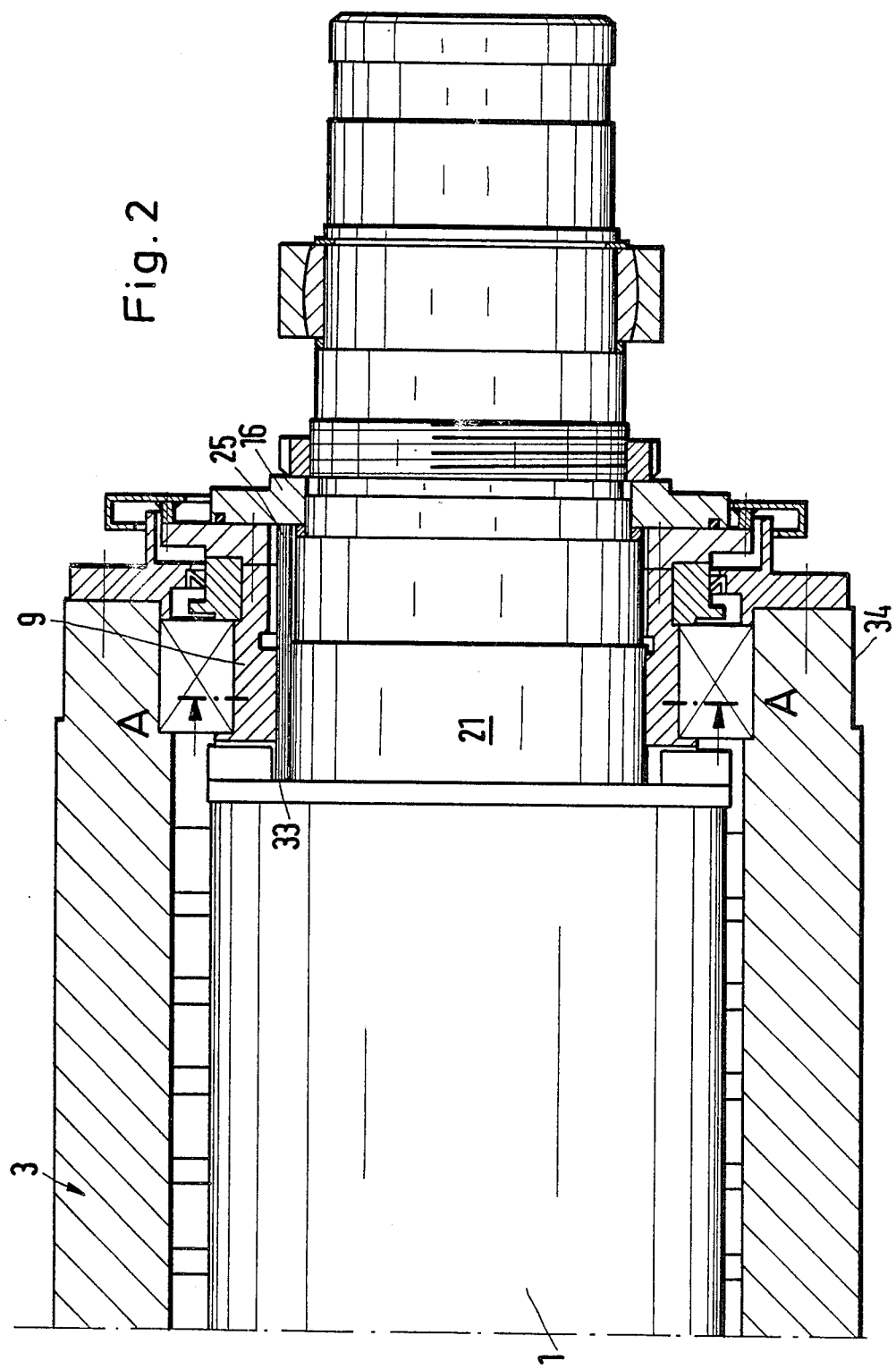
FIG. 2 shows the structure of FIG. 1 but with the insert in position, between the respective sleeve and the carrier.

FIG. 2 shows the structure of FIG. 1 and further shows an arcuate crescent-shaped insert 25 having a convex external surface (outer side) 26 (FIG. 3) which is complementary to the cylindrical internal surface 18 of the section 17 of the sleeve 9, and a concave internal surface (inner side) 27 which is complementary to the cylindrical external surface 22 of the portion 21 of the carrier 1. The centers of curvature of the surfaces 26, 27 are respectively shown at M1 and M2 (see FIG. 3); the distance between the centers of curvature M1 and M2 equals the eccentricity of the surfaces 26 and 27 relative to each other. The convex external surface (outer side) 26 of the insert 25 has four elongated grooves 28 which extend in parallelism with the axis of the shell 1. The centers of curvature M1 and M2 are located in a plane 30 which includes the axis of the shell 3 and the nip of the shell 3 with the shell (not shown) of an adjacent roll.

The purpose of the insert 25 is to convert the roll of FIG. 1 into the roll of FIG. 2, i.e., to convert a roll wherein the end portions 7 of the shell 3 have a certain freedom of radial movement relative to the carrier 1 into a roll wherein the end portions 7 can rotate around but cannot move radially of the carrier 1. To this end, the insert 25 is installed in a substantially crescent-shaped clearance 29 between the portion 21 of the carrier 1 and the sleeve 9 in such a way that the sleeve abuts the carrier at the six o'clock position and that the central portion of the clearance 29 (such central portion has the maximum width) is disposed at the twelve o'clock position as seen in FIG. 2. In other words, the widest (central) portion of the clearance 29 is disposed in the supporting plane 30 of the roll; as mentioned above, such supporting plane includes the axis of the shell 3 and the nip of the shell and the shell of the adjacent roll. It is assumed here that the topmost portion of the shell 3 is nearest to the lowermost portion of the shell of that roll which cooperates with the illustrated roll to define an elongated nip for a running web of paper, textile material or the like. If the insert 25 is machined with a reasonably high degree of accuracy, it can prevent any play between the sleeve 9 and the carrier 1 (i.e., between the carrier and the shell 3) as long as it remains in the clearance 29.

The internal surface 20 of the section 19 is provided with non-circular portions 32 (e.g., in the form of flats or arcuate portions whose curvature departs from that of the central portion of the surface 20). The end portions 31 of the insert 25 (as seen in the circumferential direction of the sleeve 9) have external surface portions which are complementary to the non-circular portions 32. This further ensures that the insert 25 is held in a predetermined optimum position in which it reliably prevents any radial stray movements of the sleeve 9 and end portion 7 of the shell 3 relative to the carrier 1. The axial position of the properly installed insert 25 is fixed by a stop shoulder 33 of the carrier 1 and by the aforementioned washer-like sealing element 16 which biases the insert 25 against the shoulder 33 in the axial direction of the shell 3.

Figure 3:
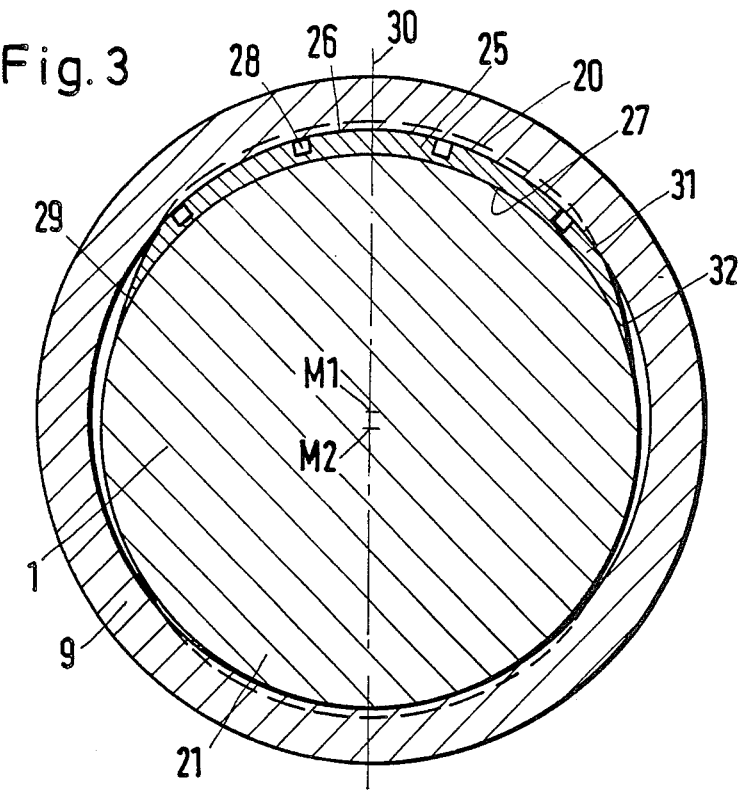
FIG. 3 is a sectional view of the sleeve, carrier and insert as seen in the direction of arrows from the line A—A of FIG. 2.

In order to install the insert 25 in the clearance 29, it is merely necessary to cause a mobile support to engage the cylindrical unground recessed end portion 34 of the peripheral surface of the shell 3 from below so that the shell is maintained in its uppermost position (i.e., the widest portion of the clearance 29 is at the twelve o'clock position). The nut 16a is removed to permit for temporary removal of the sealing element 16 which provides access to the clearance 29 for introduction of the insert 25. The bearing 2 is also removed prior to installation of the insert 25. Alternatively, the support is caused to engage the recessed end portion 34 of the peripheral surface in that position of the shell 3 which is shown in FIG. 2, and the carrier 1 is lowered until its portion 21 abuts the adjacent internal surface of the sleeve 9. Again, the widest portion of the clearance 29 is located at the twelve o'clock position (as seen in FIG. 3), and the insert 25 is then ready for introduction into the clearance. Such introduction can be carried out without resorting to any specially designed tools. The parts 2, 16 and 16a are then returned to their operative positions and the converted roll is ready for use. The sequence of the just enumerated steps is reversed if the operator wishes to remove the inserts 25 from the respective clearances 29.

The maximum thickness of the inserts 25 matches or closely approximates the difference between the inner diameters of the sleeves 9 and the outer diameters of the corresponding portions of the carrier 1 in the plane 30. The inserts 25 may but need not completely fill the respective clearances 29 (see FIG. 3), as long as the sleeves 9 are held against radial stray movements in response to introduction of the inserts. The eccentric positioning of shell 3 in operative positions of the inserts 25 does not interfere with the operation of the machine because it can be compensated for by relatively short strokes of the means for supporting two or more rolls in the frame of a calendering or like machine.

The conversion from one type to other type of roll takes up little time and does not necessitate the use of any specially designed tools. All that is necessary is to provide room for introduction or extraction of inserts from the respective clearances and to thereupon ensure that the inserts remain in the respective clearances in proper positions to prevent radial movements of the sleeves with reference to the carrier. The number of parts (namely the parts 2, 16 and 16a) which must be removed in order to allow for introduction or extraction of an insert is small, and all such parts are readily accessible at the respective axial end of the shell. The conversion can be carried out in the plant where the machine embodying the improved convertible roll is put to use or in the workshop of such plant.

The advantages of the improved convertible roll will be readily appreciated. Thus, the owner of the plant which uses the roll need not maintain a large supply of spare parts for two different rolls, and the owner need not maintain two discrete rolls in a state of readiness for replacement of two different rolls. In fact, even a single spare insert may suffice if a shell is properly held against radial movement relative to the carrier by using an insert between the carrier and one of the two sleeves. The cost of the roll is lower than that of heretofore used rolls because the roll can be mass-produced in larger quantities than heretofore used rolls since only one type must be manufactured instead of two.

In the embodiment of FIGS. 1–3 wherein the portions 21 and 23 of the carrier 1 have cylindrical external surfaces 22 and 24, and wherein the sections 17 and 19 have cylindrical internal surfaces 18 and 20, the insert 25 will fit snugly into the respective clearance 29 if its convex surface 26 has a radius of curvature matching the radius of the surface 20, and if its concave surface 27 has a radius of curvature matching the radius of the cylindrical surface 22. As mentioned above, the distance between the centers M1 and M2 of the surfaces 22 and 20 equals the maximum width of the clearance 29 in the plane 30. The insert 25 ensures a predictable and reliable retention of the shell 3 in a position in which the shell 3 is confined to rotary movements about a fixed axis. Such insert is held against angular displacement relative to the carrier 1 because its surfaces 26 and 27 are respectively complementary to the surfaces 20 and 22.

It has been found that the insert 25 need not extend along an arc in excess of 180°. In fact, it normally suffices if the length of the insert 25 (in the circumferential direction of the portion 21 or 23 of the carrier 1) is between 100° and 140°, preferably approximately or exactly 120°. An insert of such length can readily resist the forces which develop in actual use of the roll and which tend to change the radial and/or axial position of the respective sleeve 9.

The purpose of the grooves 28 in the convex surface 26 of the insert 25 is to ensure that the insert exhibits a certain amount of elasticity which is desirable during extraction but particularly during introduction of the insert into the respective clearance 29.

The provision of one or more non-circular portions 32 on the internal surface 20 of the section 19 of a sleeve 9 is optional but desirable and advantageous. Such non-circular portions cooperate with the complementary outer surfaces on the end portions 31 of the insert 25 to even more reliably prevent any undesirable shifting of a properly introduced insert in the circumferential direction of portions 21 and 23 of the carrier 1.

The non-circular portions 32 need not be provided on each of the cylindrical surfaces 22 and 24. On the other hand, the end portions 31 of an insert 25 can exhibit the same cross-sectional outline all the way from the one to the other axial end of the insert 25, i.e., the non-circular surfaces at the outer sides of the end portions 31 abut the complementary surface portions 32 of the surface 20 but are spaced apart from adjacent portions of the cylindrical surface 18. This reduces the cost of the insert 25 and renders it possible to use the insert at either axial end of the shell 3. One half of such an insert serves to transmit forces (as a result of engagement with the internal surface 18) and the other half of the insert serves to hold it against angular displacement in the circumferential direction of the surface 20. It has been found that such division of functions which are to be performed by different parts of a one-piece insert 25 contributes to its lower cost, mainly due to the fact that the machining of the insert is less expensive.

The length of an insert preferably equals or approximates the distance from the radially outermost bearing elements 5, 6 at the respective axial end of the shell 3 to the corresponding sealing element 16. Thus, if desired, the length of the insert 25 can be increased so that its leftmost part (as seen in FIG. 2) is even closer to the rightmost bearing elements 5 and 6.

Figure 4:
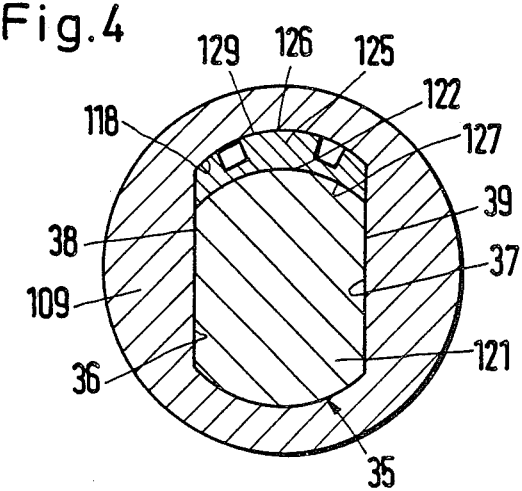
FIG. 4 is a sectional view similar to that of FIG. 3 but showing a modified carrier, a modified sleeve and a modified insert.

FIG. 4 shows a portion of a modified roll with a stationary non-rotatable carrier 121 having two flats 38, 39 which are parallel to the supporting plane 30 (not shown in FIG. 4). The sleeve 109 has a window 35 surrounded in part by internal surfaces 36, 37 which are adjacent to and abut the surfaces 38, 39 of the carrier 121 so as to ensure that the sleeve 109 can move up and down (as seen in FIG. 4) through distances corresponding to the maximum width of the clearance 129 between the arcuate top surface 122 of the carrier 121 and the complementary or substantially complementary internal surface 118 of the sleeve 109. In FIG. 4, the surface 122 abuts the concave internal surface or inner side 127 of an arcuate insert 125. The convex surface 126 of this insert has two grooves which extend in parallelism with the axis of the sleeve 109. The shell (not shown in FIG. 4) and the sleeve 109 can move relative to the carrier 121 when the insert 125 is withdrawn, and such radial movability of the shell is terminated in response to reintroduction of the insert 125 between the sleeve 109 and the carrier 121.

In order to extract the insert 125, the operator places a suitable support against the lowermost portion of the peripheral surface of the shell and the carrier 121 is lowered to the position which is shown in FIG. 4. Such lowering is preceded or followed by removal of the parts (not shown in FIG. 4) which correspond to the parts 2, 16 and 16a of the roll of FIGS. 1 to 3.

The convex external surface 126 of the insert 125 is complementary to the concave internal surface 118 of the sleeve 109, and the concave internal surface 127 of the insert 125 is complementary to the convex surface 122 of the carrier 121. The radius of curvature of the surfaces 118, 126 can match the radius of curvature of the surfaces 122, 127.

The improved method is simple and can be carried out with rudimentary tools in a relatively small workshop or directly at the locale of the machine. All that is necessary is to prop the shell 3 from below (particularly at the end portions 34 of its peripheral surface) and to thereupon lower the carrier 1 by the mechanism which is available in a calender) so that the portion 21 and/or 23 at each axial end of the carrier 1 comes to rest on the respective section (18 or 20) of the internal surface of the respective sleeve 9. The bearing 2 is then removed prior to removal of the nut 16a and sealing element 16 so that the previously introduced insert 25 is ready for extraction or that the clearance 29 is ready to receive an insert 25. The introduction of an insert 25 takes place at one side of the axis of the shell 3 while the carrier 1 abuts the respective sleeve 9 at the outer side of such axis. The carrier 1 can be lowered by gravity to come to rest on the sleeves 9 whereby the sleeves 9 and the respective portions 21, 23 at both axial ends of the carrier automatically define two clearances 29 which are ready to receive inserts 25.

The improved roll can be modified in a number of additional ways without departing from the spirit of the invention. For example, the one and/or the other row of bearing elements (5 and/or 6) can be replaced with a continuous bearing element including a cushion of hydraulic fluid which extends all the way, or close to all the way, between the end portions of the shell. Moreover, the hydrostatic bearing elements can be replaced with electromagnetic bearing elements, e.g., of the type disclosed in commonly owned U.S. Pat. No. 4,290,353 granted Sept. 22, 1981 to Pav et al. and in commonly owned U.S. Pat. No. 4,376,330 granted Mar. 15, 1983 to Weidinger et al. It is also possible to employ bearing elements in the form of rolls which are movable radially of the carrier.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A roll for use in calenders and like machines, comprising a carrier; a shell spacedly surrounding the carrier and having first and second end portions; first and second sleeves provided on the respective end portions of said shell, said sleeves and said carrier respectively having confronting internal and external surfaces and the sleeves being movable relative to the carrier in the radial direction of said shell to and from end positions in which said external surfaces and the respective internal surfaces define clearances having a predetermined width at one side of the axis of said shell, said clearances having a maximum width in a predetrmined plane including the axis of said shell; and removable first and second inserts disposed in the respective clearances to hold the sleeves against movement from said end positions, said inserts contacting the respective internal and external surfaces in as well as at both sides of said plane and each of said inserts extending along an arc of less than 180° in the circumferential direction of said shell.

2. The roll of claim 1, wherein said surfaces are portions of or complete cylindrical surfaces and the diameter of each internal surface exceeds the diameter of the respective external surface by a predetermined value corresponding to the maximum width of said clearances, each of said inserts having a concave surface conforming to the respective external surface and a convex surface conforming to the respective internal surface.

3. The roll of claim 1, wherein said arc is between 100 and 140 degrees.

4. The roll of claim 3, wherein said arc is approximately 120 degrees.

5. The roll of claim 1, wherein each of said inserts has a first surface adjacent the respective internal surface and a second surface adjacent the respective external surface, at least one of said first and second surfaces having a plurality of grooves extending in substantial parallelism with the axis of said shell.

6. A roll for use in calenders and like machines, comprising a carrier; a shell spacedly surrounding the carrier and having first and second end portions; first and second sleeves provided on the respective end portions of said shell, said sleeves and said carrier respectively having confronting internal and external surfaces and the sleeves being movable relative to the carrier in the radial direction of said shell to and from end positions in which said external surfaces and the respective internal surfaces define clearances having a predetermined width at one side of the axis of said shell, said clearances having a maximum width in a predetermined plane including the axis of said shell and each of said internal surfaces having at least one non-circular portion; and removable first and second inserts disposed in the respective clearances to hold the sleeves against movement from said end positions, said inserts contacting the respective internal and external surfaces in as well as at both sides of said plane and said inserts having surfaces including portions which are at least substantially complementary to the non-circular portions of the respective internal surfaces.

7. A roll for use in calenders and like machines, comprising a carrier; a shell spacedly surrounding the carrier and having first and second end portions; first and second sleeves provided on the respective end portions of said shell, said sleeves and said carrier respectively having confronting internal and external surfaces and the sleeves being movable relative to the carrier in the radial direction of said shell to and from end positions in which said external surfaces and the respective internal surfaces define clearances having a predetermined width at one side of the axis of said shell, said clearances having a maximum width in a predetermined plane including the axis of said shell and each of said internal surfaces including a cylindrical first section and a second section adjacent the first section in the axial direction of the respective sleeve and having at least one non-circular portion; and removable first and second inserts disposed in the respective clearances to hold the sleeves against movement from said end positions, said inserts contacting the respective internal and external surfaces in as well as at both sides of said plane, each of said inserts having a constant cross-sectional outline and including a first portion abutting said first section and a second portion abutting the non-circular portion of the second section of the respective internal surface.

8. A roll for use in calenders and like machines, comprising a carrier; a shell spacedly surrounding the carrier and having first and second end portions; first and second sleeves provided on the respective end portions of said shell, said sleeves and said carrier respectively having confronting internal and external surfaces and the sleeves being movable relative to the carrier in the radial direction of said shell to and from end positions in which said external surfaces and the respective internal surfaces define clearances having a predetermined width at one side of the axis of said shell, said clearances having a maximum width in a predetermined plane including the axis of said shell; removable first and second inserts disposed in the respective clearances to hold the sleeves against movement from said end positions, said inserts contacting the respective internal surfaces in as well as at both sides of said plane and said carrier having a fixed stop for each of said inserts; and means for biasing each insert against the respective stop in the axial direction of said shell.

9. The roll of claim 8, wherein each of said stops includes a substantially circumferentially extending shoulder of said carrier and said biasing means comprises annular sealing elements, each of said inserts being disposed between the respective shoulder and the respective sealing element.

* * * * *